(12) United States Patent
Khokhar

(10) Patent No.: US 9,311,176 B1
(45) Date of Patent: Apr. 12, 2016

(54) EVALUATING A SET OF STORAGE DEVICES AND PROVIDING RECOMMENDED ACTIVITIES

(71) Applicant: EMC Corporation, Hopkinton, MA (US)

(72) Inventor: Muzhar S. Khokhar, Shrewsbury, MA (US)

(73) Assignee: EMC Corporation, Hopkinton, MA (US)

(*) Notice: Subject to any disclaimer, the term of this patent is extended or adjusted under 35 U.S.C. 154(b) by 171 days.

(21) Appl. No.: 13/681,932

(22) Filed: Nov. 20, 2012

(51) Int. Cl.
*G06F 11/07* (2006.01)
*G06F 11/00* (2006.01)

(52) U.S. Cl.
CPC .......... *G06F 11/0781* (2013.01); *G06F 11/008* (2013.01); *G06F 11/079* (2013.01); *G06F 11/0766* (2013.01); *G06F 11/0775* (2013.01)

(58) Field of Classification Search
CPC .............. G06F 11/0775; G06F 11/079; G06F 11/0781; G06F 11/0766
USPC .......................................................... 714/42
See application file for complete search history.

(56) References Cited

U.S. PATENT DOCUMENTS

| | | | | |
|---|---|---|---|---|
| 4,633,467 A | * | 12/1986 | Abel ..................... | G06F 11/079 714/3 |
| 5,463,768 A | * | 10/1995 | Cuddihy et al. ................ | 714/37 |
| 6,317,850 B1 | * | 11/2001 | Rothberg ...................... | 714/704 |
| 6,343,236 B1 | * | 1/2002 | Gibson et al. .................. | 700/79 |
| 6,415,395 B1 | * | 7/2002 | Varma et al. ................... | 714/37 |
| 6,725,398 B1 | * | 4/2004 | Varma ................. | G06F 11/0748 706/47 |
| 6,944,800 B2 | * | 9/2005 | Brundridge et al. ............ | 714/48 |
| 6,981,182 B2 | * | 12/2005 | Roddy et al. ................. | 714/47.3 |
| 6,988,011 B2 | * | 1/2006 | Varma et al. .................... | 700/79 |
| 7,627,786 B2 | * | 12/2009 | Bello et al. ..................... | 714/42 |
| 7,636,708 B2 | * | 12/2009 | Garcea et al. | |
| 7,860,898 B1 | | 12/2010 | Moranta et al. | |
| 7,904,652 B1 | | 3/2011 | Castelli et al. | |
| 7,930,476 B1 | | 4/2011 | Castelli et al. | |
| 7,971,103 B2 | * | 6/2011 | Brugler et al. .................. | 714/48 |
| 8,082,330 B1 | | 12/2011 | Castelli et al. | |
| 8,150,877 B1 | * | 4/2012 | Wood et al. ................... | 707/784 |
| 8,161,083 B1 | | 4/2012 | Wood et al. | |
| 8,326,794 B1 | | 12/2012 | Wood et al. | |
| 8,352,789 B2 | * | 1/2013 | Ishiou ................. | G06F 11/0709 706/45 |
| 8,572,439 B2 | * | 10/2013 | Stanko et al. ................... | 714/39 |
| 8,601,323 B2 | * | 12/2013 | Tsantilis ........................ | 714/42 |
| 2003/0145130 A1 | * | 7/2003 | Schultz et al. ................ | 709/325 |

(Continued)

*Primary Examiner* — Albert Decady
*Assistant Examiner* — Paul Contino
(74) *Attorney, Agent, or Firm* — BainwoodHuang

(57) ABSTRACT

A technique evaluates a set of storage devices (e.g., magnetic disk drives, solid state drives, etc.). The technique involves receiving, by processing circuitry (e.g., a storage processor, a standalone computer, etc.), storage device evaluation factors which (i) map possible storage device error events to individual weights and (ii) map cumulative weights to recommended activities. The technique further involves receiving, by the processing circuitry, a storage device error log containing storage device error entries identifying actual storage device error events which were encountered by the set of storage devices while performing data storage operations over a period of time. The technique further involves analyzing, by the processing circuitry, the storage device error entries based on the storage device evaluation factors to produce a set of evaluation results identifying a set of recommended activities to be performed on the set of storage devices.

26 Claims, 9 Drawing Sheets

(56) References Cited

U.S. PATENT DOCUMENTS

| | | | |
|---|---|---|---|
| 2004/0230868 A1* | 11/2004 | Sabet | H04L 12/24 714/25 |
| 2005/0125688 A1* | 6/2005 | Ogawa | H04L 43/0835 726/1 |
| 2007/0101202 A1* | 5/2007 | Garbow | G06F 11/008 714/47.2 |
| 2009/0006896 A1* | 1/2009 | Nakagawa | G06F 11/2268 714/37 |
| 2009/0106327 A1* | 4/2009 | Dilman | G06F 11/0727 |
| 2009/0125759 A1* | 5/2009 | Hu | G06F 11/0766 714/54 |
| 2010/0318856 A1* | 12/2010 | Yoshida | 714/47 |
| 2011/0055669 A1* | 3/2011 | DeHaan | G06F 11/0709 714/799 |
| 2011/0154117 A1* | 6/2011 | Danielson et al. | 714/37 |
| 2012/0036397 A1* | 2/2012 | Balani et al. | 714/38.11 |
| 2012/0192008 A1* | 7/2012 | Suzuki | 714/15 |
| 2012/0303793 A1* | 11/2012 | Mestemaker | H04L 41/046 709/224 |
| 2013/0151897 A1* | 6/2013 | Sugaya | 714/27 |
| 2013/0166964 A1* | 6/2013 | Jerde et al. | 714/48 |

* cited by examiner

```
drive[samsung_ssd].vendor_id ~ 'SAMSUNG||SATA\'
drive[samsung_ssd].tla_part_number ~ '0050491841|0050492275||0050049189'
sense[1].record = 'r,01,<19H,*,1,604800,X'
sense[2].record = 'r,03,11,*,10,86400,X'
sense[3].record = 'w,02,<12H,*,20,86400,WG1'
sense[4].record = 'w,04,>=19H,*,50,604800,WG1'
rule[samsung_ssd_r1].status ~ (red||yellow)
rule[samsung_ssd_r1].drive_header_rule ~ (samsung_ssd)
rule[samsung_ssd_r1].product_revision <> (TC3Q/2264)
rule[samsung_ssd_r1].result = 'Replace the drive with a spare that has TC3Q/2264
firmware installed on it.'
...
```

FIG. 5

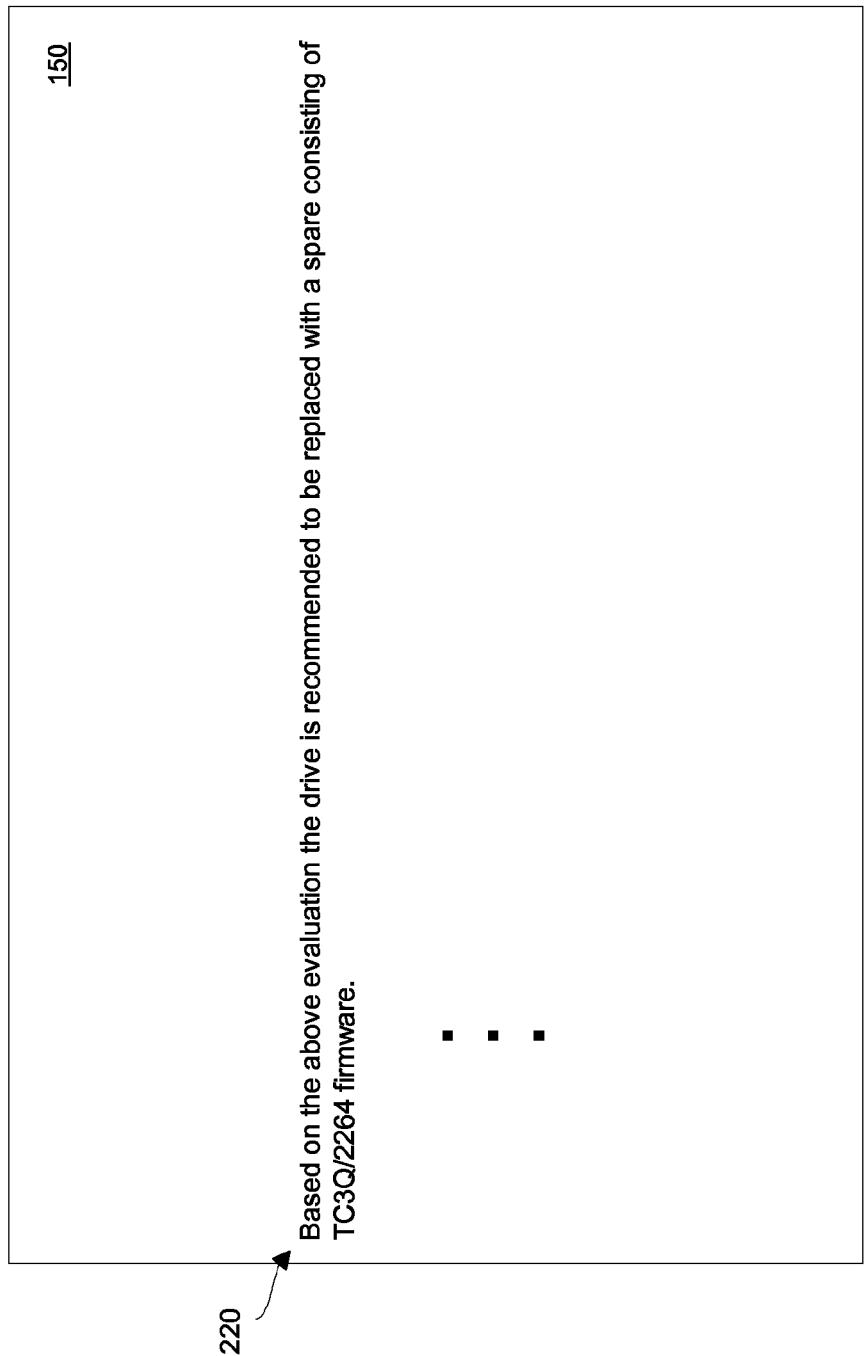

EVALUATING A SET OF STORAGE DEVICES AND PROVIDING RECOMMENDED ACTIVITIES

BACKGROUND

Some conventional data storage arrays are equipped with a local utility to handle drive errors on storage drives (e.g., solid state drives, magnetic disk drives, etc.). Such a utility may run in the background on a storage processor, and monitor drive errors as they occur in real time.

For example, for a particular storage drive, the local utility may maintain a summed total of error weights that represents a level of performance for that storage drive. As time passes, the utility may discount certain error weights from initial values to lower values thus lowering the summed total (e.g., fading out errors that become older than 24 hours). Additionally, the utility may add new error weights in response to new drive errors thus raising the summed total.

During operation, if the summed total exceeds a predetermined threshold, the local utility either (i) deactivates that storage drive (i.e., "kills the drive"), or (ii) copies data from that storage drive to a replacement storage drive (e.g., a storage drive that is on hot standby) and then deactivates that storage drive (i.e., "spares the drive"). For example, the local utility may kill a drive if the utility concludes that copying the data to a replacement drive would severely impact performance (e.g., create excessive noise, severely slow IO, etc.). As another example, the utility may spare the drive if the utility concludes that copying the data to a replacement drive prior to deactivating the drive is worthwhile (e.g., alleviating the need to reconstruct the data from other drives, etc.).

SUMMARY

It should be understood that there are deficiencies to the above-described conventional approach of simply killing or sparing a storage drive when the summed total of error weights for that drive exceeds a threshold. For example, there may be situations which are appropriate for options other than killing or sparing a storage drive. Along these lines, suppose that the media and the drive hardware for a particular storage drive are fine, but that the storage drive's firmware requires updating. Here, the alternatives of killing or sparing the storage drive may be inappropriate or too heavy handed vis-à-vis a solution of simply updating the storage drive's firmware.

As another example, updates to the local utility to enable the utility to identify new drive errors may occur infrequently such as only during quarterly upgrades of the data storage array operating system. Moreover, if the quarterly operating system upgrade relies on the customer (rather than the manufacturer) to perform the upgrade, there is no guarantee that the upgrade will even occur (e.g., some customers perform upgrades only when the upgrade is perceived as absolutely necessary). Accordingly, even if the local utility is updated to identify a particular new drive error and kill/spare drives having this error, infrequent deployment of the updated version of the utility may result in a long latency before the updated version is put into service, if at all.

As yet another example, the conventional local utility is typically not configured to perform a very thorough or precise evaluation of drive operation. Along these lines, the error weights that are used by the utility are typically generic (i.e., the error weights do not vary depending on storage drive manufacturer). Additionally, the conventional local utility cannot group different errors into "buckets" to diagnose complex drive issues that are characterized by multiple errors of different types (e.g., a first type of drive error within a 48 hour period in combination with a second type of drive error within a 24 hour period). To the contrary, the diagnostic capabilities of the conventional local utility are generally limited since the purpose of the conventional local utility is primarily to provide high availability, not a detailed diagnosis.

In contrast to the above-described conventional local utility which handles drive errors simply by either killing or sparing storage drives, an improved technique involves the use of a tool which analyzes a storage device error log identifying actual error events which were encountered by storage devices, determines the health of the storage devices, and provides appropriate recommendations. With such recommendations, activities other than killing or sparing a storage device are readily available such as upgrading an operating system, upgrading firmware, reseating a storage device, replacing a storage device, and so on. In some arrangements, the tool is configurable via a data file which stores a rich set of text-based factors (or configuration rules). Such an arrangement provides repeatability, flexibility, configuration ease, and the capability of detecting complex drive errors.

One embodiment is directed to a method of evaluating a set of storage devices. The method is performed in an electronic apparatus having processing circuitry. The method includes receiving, by the processing circuitry, storage device evaluation factors which (i) map possible storage device error events to individual weights and (ii) map cumulative weights to recommended activities. The method further includes receiving, by the processing circuitry, a storage device error log containing storage device error entries identifying actual storage device error events which were encountered by the set of storage devices while performing data storage operations over a period of time. The method further includes analyzing, by the processing circuitry, the storage device error entries based on the storage device evaluation factors to produce a set of evaluation results identifying a set of recommended activities to be performed on the set of storage devices.

In the context of a data storage system which holds the set of storage devices, such a method is capable of being performed by circuitry external to the data storage system in an offline manner (e.g., a standalone computer, in the cloud, etc.). Alternatively, the method is capable of being performed by processing circuitry of the data storage system in an online manner (e.g., by a storage processor, by a service processor, by a host computer, etc.).

In some arrangements, the storage device evaluation factors are stored in a data file which can be easily edited and embellished by a user. That is, the user is able to simply add storage device evaluation factors to the data file to configure the tool to detect a new storage device error and recommend an appropriate fix. Further actions such as modifying, updating, and/or deleting factors are easily accomplished via editing the data file.

In some arrangements, the storage device error log containing the storage device error entries is obtained via an information dump (e.g., bundled storage array data such as that of SPcollects) from a data storage array. In these situations, access to detailed storage device information is available such as the operating system version, the storage device types, the storage device part numbers, storage device manufacturer data, firmware versions, and so on.

It should be understood that, in the cloud context, electronic circuitry to perform the method is formed by remote computer resources distributed over a network. Such a computing environment is capable of providing certain advantages such as enhanced fault tolerance, load balancing, processing flexibility, etc.

Other embodiments are directed to electronic systems, arrays, and apparatus, processing circuits, computer program products, and so on. Some embodiments are directed to various processes, electronic components and circuitry which are involved in evaluating a set of storage devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is an example of a data file utilized by the electronic apparatus of FIG. 2.

FIG. 6 is an example of a report provided by the electronic apparatus of FIG. 2.

DETAILED DESCRIPTION

Improved techniques involve the use of a tool which analyzes a storage device error log identifying actual error events which were encountered by storage devices, determines the health of the storage devices, and provides appropriate recommendations. With such recommendations, activities other than killing or sparing a storage device are readily available such as upgrading an operating system, upgrading firmware, reseating a storage device, replacing a storage device, and so on. In some arrangements, the tool is configurable using a rich set of text-based factors (or configuration rules). Such features provide flexibility, configuration ease, and the capability of detecting complex drive errors.

Figure 1:
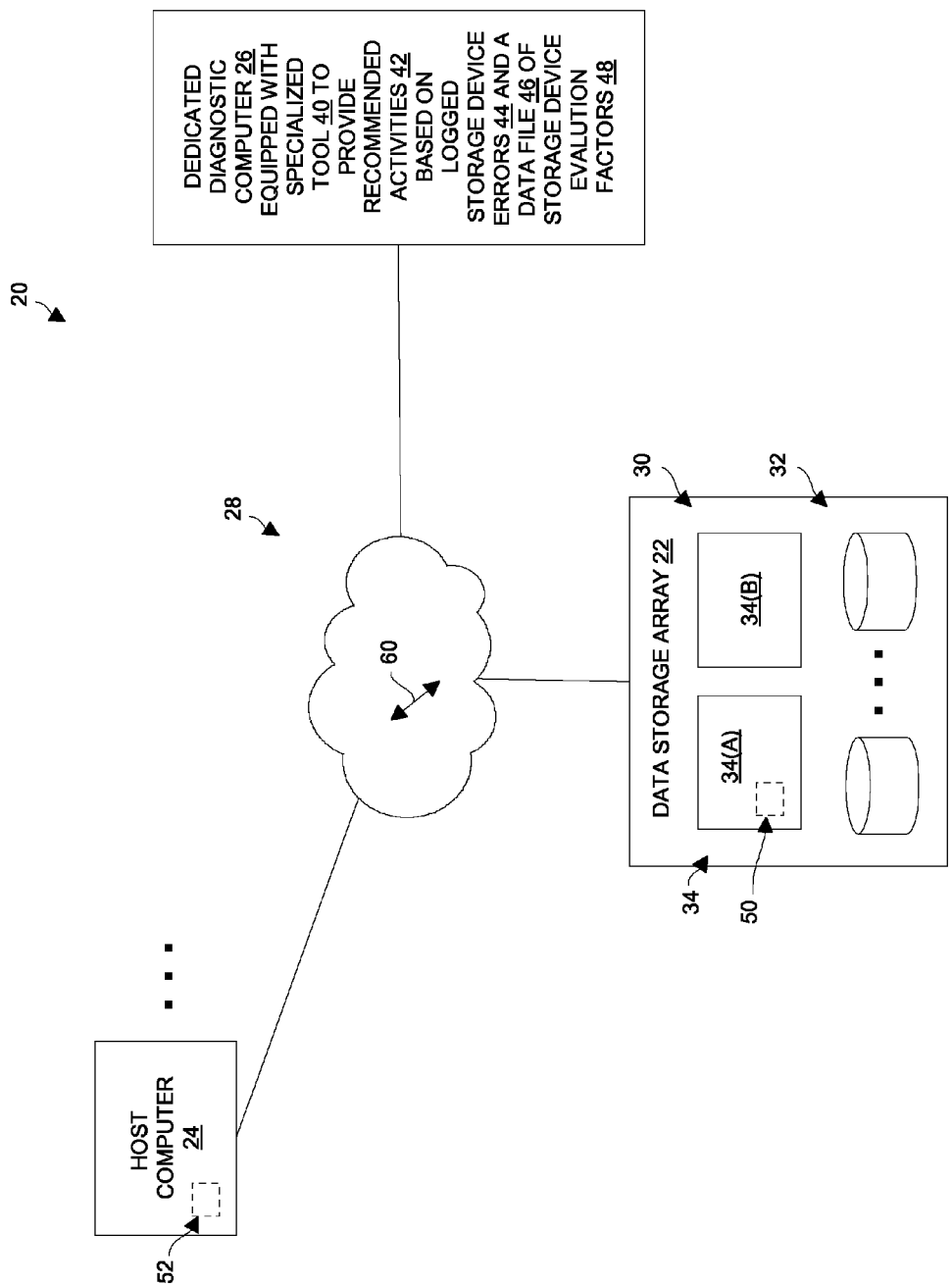
FIG. 1 is a block diagram of an electronic environment which is suitable for evaluating a set of storage devices in accordance with this disclosure.

FIG. 1 shows an electronic environment 20 which is suitable for evaluating a set of storage devices. The electronic environment 20 includes a data storage array 22, a host computer 24, a dedicated diagnostic computer 26, and a communications medium 28.

The data storage array 22 is constructed and arranged to perform data storage operations on behalf of one or more host computers 24. To this end, the data storage array 22 includes storage processing circuitry 30 and a set of storage devices 32. The storage processing circuitry 30 performs write and read operations to store host data into, and load data from the set of storage devices 32. The set of storage devices 32 includes non-volatile storage such as solid state drives (SSD's), high speed magnetic disk drives, and lower speed (or legacy) magnetic disk drives which are arranged in different tiers based on speed, etc.

By way of example, the storage processing circuitry 30 includes multiple storage processors 34(A), 34(B) (e.g., processing circuitry running an operating system) for fault tolerance and load balancing. Similarly, the storage devices 32 may be configured for fault tolerance and load balancing (e.g., for mirroring, as RAID groups, and so on).

The host computer 24 is constructed and arranged to issue load and store commands to the data storage array to load and store host data. Although only one host computer is shown for simplicity, it should be understood that the data storage array 22 is capable of operating on behalf of multiple host computers 24 (e.g., host clusters, individual host computers, etc.). Such communications may be network-based (e.g., iSCSI), block-based (e.g., SCSI), combinations thereof, and so on.

The dedicated diagnostic computer 26 is constructed and arranged to evaluate the set of storage devices 32 of the data storage array 22 and provide recommendations to improve performance. Along these lines, the dedicated diagnostic computer 26 is equipped with a specialized tool 40 to recommend activities 42 based on logged storage device errors 44 and a data file 46 of storage device evaluation factors 48. As will be explained in further detail shortly, the storage device evaluation factors 48 (i) map possible storage device error events to individual weights and (ii) map cumulative weights to the recommended activities 42. These recommended activities 42 may include upgrading storage device firmware, upgrading the operating system of the data storage array 22, re-seating one or more storage devices 32, replacing one or more storage devices 32, and so on.

It should be understood that the specialized tool 40 (e.g., processing circuitry running specialized software) is shown as residing within the dedicated diagnostic computer 26 thus enabling the specialized tool 40 to run in a manner which is offline with respect to the data storage array 22. Nevertheless, it should be further understood that the specialized tool 40 is capable of residing at other locations. For example, the specialized tool 40 is capable of residing within the data storage array 22 such as on a storage processor (see box 50) or on a service processor to run the specialized tool 40 in an online manner while the data storage array 22 is in operation. As another example, the specialized tool 40 is capable of residing within a host computer 24 (see box 52), and so on.

The communications medium 28 connects the various components of the electronic environment 20 together to enable these components to exchange electronic signals 60 (e.g., see the double arrow 60). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, or combinations thereof.

During operation, the data storage array 22 receives load and store commands from the host computer 24 and processes these commands to load host data from and store data into the set of storage devices 32. While the data storage array 22 performs load and store commands, the data storage array 22 maintains configuration information and logs error events which can be accessed later for diagnostic purposes. SPcollects is an example of a bundle of configuration information and logged error events that can be gathered and supplied by a data storage array 22.

This configuration information may include hardware information such as the part numbers and manufacturers of the storage processing circuitry 30, the part number and manufacturer of each storage device 32, and so on. Additionally, the configuration information may include software and firmware versions of the operating system and boot code, the firmware version of each storage device 32, configuration parameters and states such as RAID groupings, tiers, hot stand-by drives, and so on.

In terms of error events, storage device errors are logged in response to storage device error events which are encountered by the set of storage devices 32. Along these lines, many data storage arrays identify storage device errors using a numerical code having a format such as "xx/yy/zz" where xx, yy and zz are numbers identifying the particular storage device error. For example, the data storage array 22 may log, as a first storage device error and a first timestamp (i.e., the time of the error event), a first numerical code having this format in response to an error reading a block from a particular storage device. Subsequently, the data storage array 22 may log, as a second storage device error and a second timestamp, a second numerical code having this format in response to an error writing a block from the particular storage device, and so on.

After the data storage array 22 has logged error event data for a period of time, the specialized tool 40 is able to evaluate the logged error events and recommend activities to improve performance. To this end, the dedicated diagnostic computer 26 retrieves this data and then processes the data locally. Such operation may occur automatically (e.g., via operation of a computerized scheduling program) or manually by a user operating the dedicated diagnostic computer 26 (e.g., pushing or pulling the data to the dedicated diagnostic computer 26 in response to user commands). Further details will now be provided with reference to FIG. 2.

Figure 2:
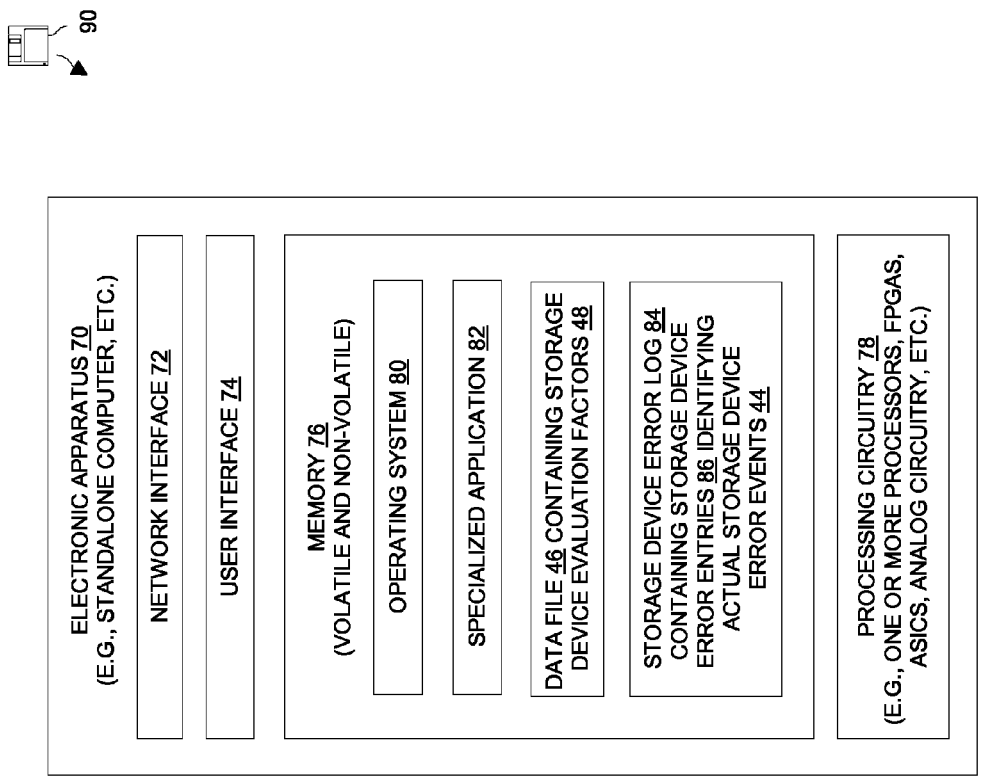
FIG. 2 is a block diagram of an electronic apparatus of the electronic environment of FIG. 1.

FIG. 2 is a block diagram of an electronic apparatus 70 for evaluating the set of storage devices 32 and providing recommended activities 42 (also see FIG. 1). As shown in FIG. 2, the electronic apparatus 70 includes a user interface 72, memory 74, and processing circuitry 76. Such an electronic apparatus 70 is capable of being implemented in the form a standalone computer (e.g., the dedicated diagnostic computer 26 in FIG. 1), or as part of the data storage array 22 or a host computer 24 (e.g., sharing resources and components of these electronic systems).

The network interface 72 is constructed and arranged to connect the electronic apparatus 70 to the communications medium 28. Accordingly, the network interface 72 enables the electronic apparatus 70 to communicate with the other components of the electronic environment 20 (FIG. 1).

The user interface 74 is constructed and arranged to receive input from a user and provide output to the user. In the context of a standalone computer, the user interface 74 may be formed by a standard keyboard, pointing device (e.g., mouse) and display. In the context of the data storage array 22 and the host computer 24, the user interface 74 may be formed by a console (e.g., a service processor, a user terminal, a general purpose computer configured with a GUI to access data storage array 22 and the host computer 24, and so on).

The memory 76 is intended to represent both volatile memory (e.g., DRAM, SRAM, etc.) and non-volatile memory (e.g., flash storage units, magnetic disk drives, etc.). The memory 76 stores a variety of software constructs including an operating system 80, a specialized application 82, a data file 46 (also see FIG. 1), and a storage device error log 84.

The operating system 80 includes standard OS components (e.g., a kernel or core modules, drivers, utilities and tools, etc.) to share and manage the resources electronic apparatus 70. The specialized application 82 is a set of instructions which, when carried out, cause the electronic apparatus 70 to evaluate the set of storage devices 32 and recommend activities 42 to the user. The storage device error log 84 contains storage device error entries 86 identifying actual storage device error events 44 which were encountered by the set of storage devices 32 while performing data storage operations over a period of time. The data file 46 contains storage device evaluation factors 48 which dictate (i) how the specialized application 82 analyzes the actual storage device error events 44 of the storage device error log 84, and (ii) which activities 42 to recommend to the user to improve performance.

The processing circuitry 78 is constructed and arranged to operate in accordance with the various software constructs stored in the memory 76. Such circuitry may be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic apparatus 70. The computer program product 90 has a non-transitory (or non-volatile) computer readable medium which stores a set of instructions which controls one or more operations of the electronic apparatus 70. Examples of suitable computer readable storage media include tangible articles of manufacture and apparatus which store instructions in a non-volatile manner such as CD-ROM, flash memory, disk memory, tape memory, and the like.

During operation, the processing circuitry 78 receives, from the memory 76, the storage device evaluation factors 48 from the data file 46. As will be explained in further detail shortly, the storage device evaluation factors 48 (i) map possible storage device error events to individual weights and (ii) map cumulative weights to recommended activities 42.

Additionally, the processing circuitry 78 receives, from the memory 76, the storage device error log 84 containing the storage device error entries 86 identifying actual storage device error events 44 which were encountered by the set of storage devices 32 while the data storage array 22 performed data storage operations over a period of time.

The processing circuitry 78 then analyzes the storage device error entries 44 based on the storage device evaluation factors 48 to provide, through the user interface 74, a set of evaluation results identifying the recommended activities 42 to be performed on the set of storage devices 32. Such activities 42, when performed on the data storage array 22 will improve operation of the data storage array 22. Further details will now be provided with reference to FIG. 3.

Figure 3:
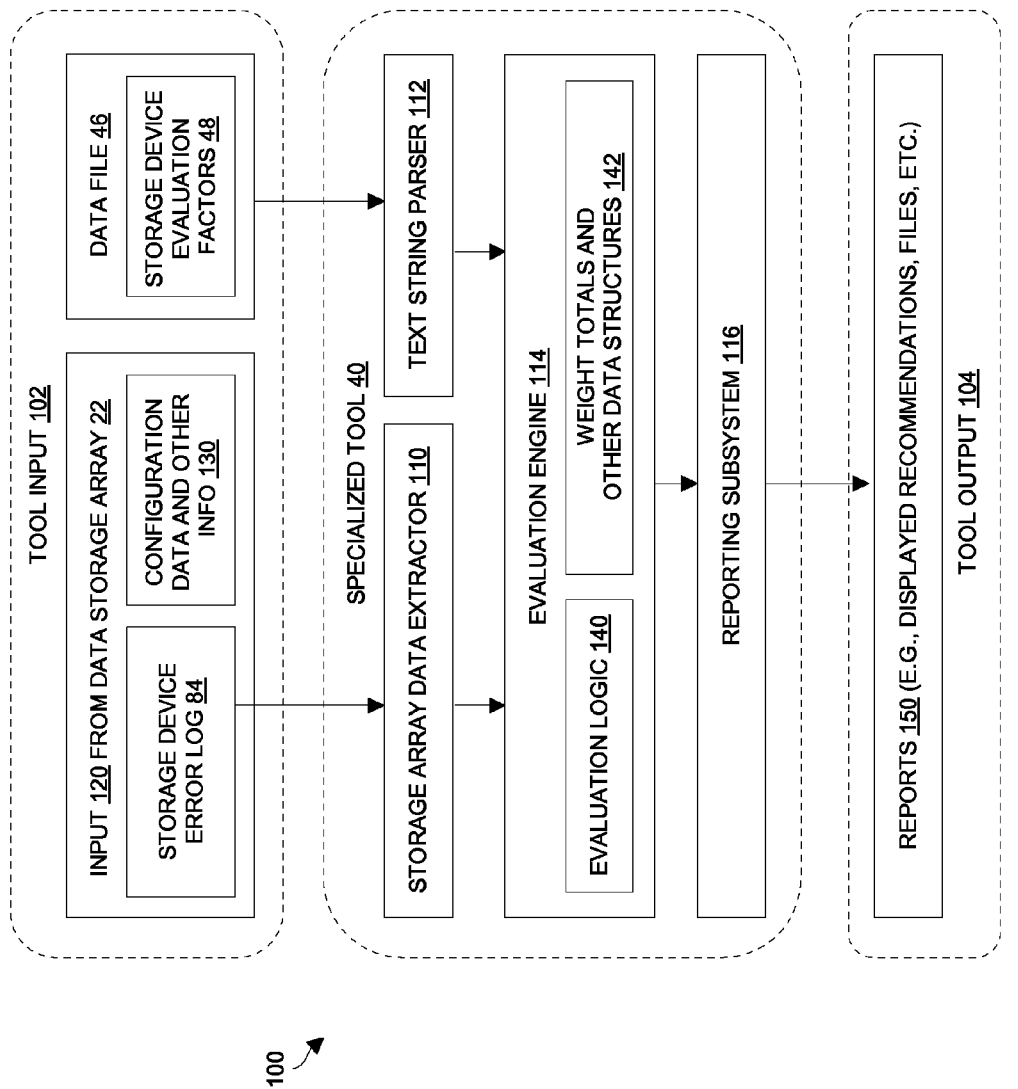
FIG. 3 is a block diagram of particular modules which are formed by the electronic apparatus when executing a specialized application.

FIG. 3 shows a modular architecture 100 which is well suited for the specialized tool 40. The particular modules shown in FIG. 3 are formed by the electronic apparatus 70 when the processing circuitry 78 executes the specialized application 82 (also see FIG. 2).

Further shown in FIG. 3 is an information flow. In particular, tool input 102 is provided to the specialized tool 40, and processed by particular modules of the specialized tool 40. Following such processing, the specialized tool 40 provides tool output 104 to a user.

As shown, the specialized tool 40 includes a storage array data extractor 110, a text string parser 112, an evaluation engine 114, and a reporting subsystem 116. Each module of the specialized tool 40 performs an assigned set of tasks. Furthermore, such modularity allows code portability and clarity.

The storage array data extractor 110 is constructed and arranged to extract various information from input 120 received from the data storage array 22, and provide that information for use by the evaluation engine 114. This array input 120 includes the storage device error log 84 containing storage device errors 44 (FIG. 2). This array input 120 further includes configuration data and other information 130 from the data storage array 22 such as part numbers, software release information, firmware versions, operating parameters, and so on. A suitable form for the array input 120 is bundled storage array data such as that of SPcollects which contains all the logged errors for all drives as well as other configuration information of a data storage system. A suitable form for the output provided from the storage array data extractor 110 is comma delimited data (e.g., in a temporary file) which is available for further processing by the evaluation engine 114.

The text string parser 112 is constructed and arranged to read storage device evaluation factors 48 from a data file 46 and direct the evaluation engine 114 as to how to interpret and process the array input 120 from the data storage array 22. That is, the storage device evaluation factors 48 is logic (stated in the form of rules or definitions) which maps sense and other error patterns to end results and/or recommendations. The storage device evaluation factors 48 take the form of text strings thus enabling the user to easily craft evaluation instructions dictating how the evaluation engine 114 is to process the array input 120. In particular, having editable instructions in an external file ensures easy maintenance of the logic, rules and results. With the ability to reliably (and consistently) take the evaluation input from the data file 46, the specialized tool 40 can receive configuration instructions (tokenizing the input as applicable) and convert/parse the evaluation input into data structures that the evaluation engine 114 can understand.

The evaluation engine 114 is coupled to the storage array data extractor 110 and the text string parser 112. The evaluation engine 114 includes evaluation logic 140, as well as weight totals and other data structures 142 which were dictated by the storage device evaluation factors 48 parsed by the text string parser 112. The evaluation engine 114 then receives the extracted information from the storage array data extractor 110 (e.g., the comma delimited error data) and processes that information using the evaluation logic 140. In particular, the evaluation engine 114 maintains tallies of weights of errors for individual storage devices 32 and/or groups of storage devices 32. Additionally, the evaluation engine 114 compares these tallies against a set of thresholds, generates a set of recommendations and provides the set of recommendations to the reporting subsystem 116.

The reporting subsystem 116 takes the set of recommendations and displays it to the user via the user interface 74 (FIG. 2). As an alternative, or in combination with, displaying the set of recommendations to the user, the reporting subsystem 116 is capable of providing a report 150 (e.g., in a file) for future access by the user. Further details will now be provided with reference to FIGS. 4 through 6.

Figure 4:
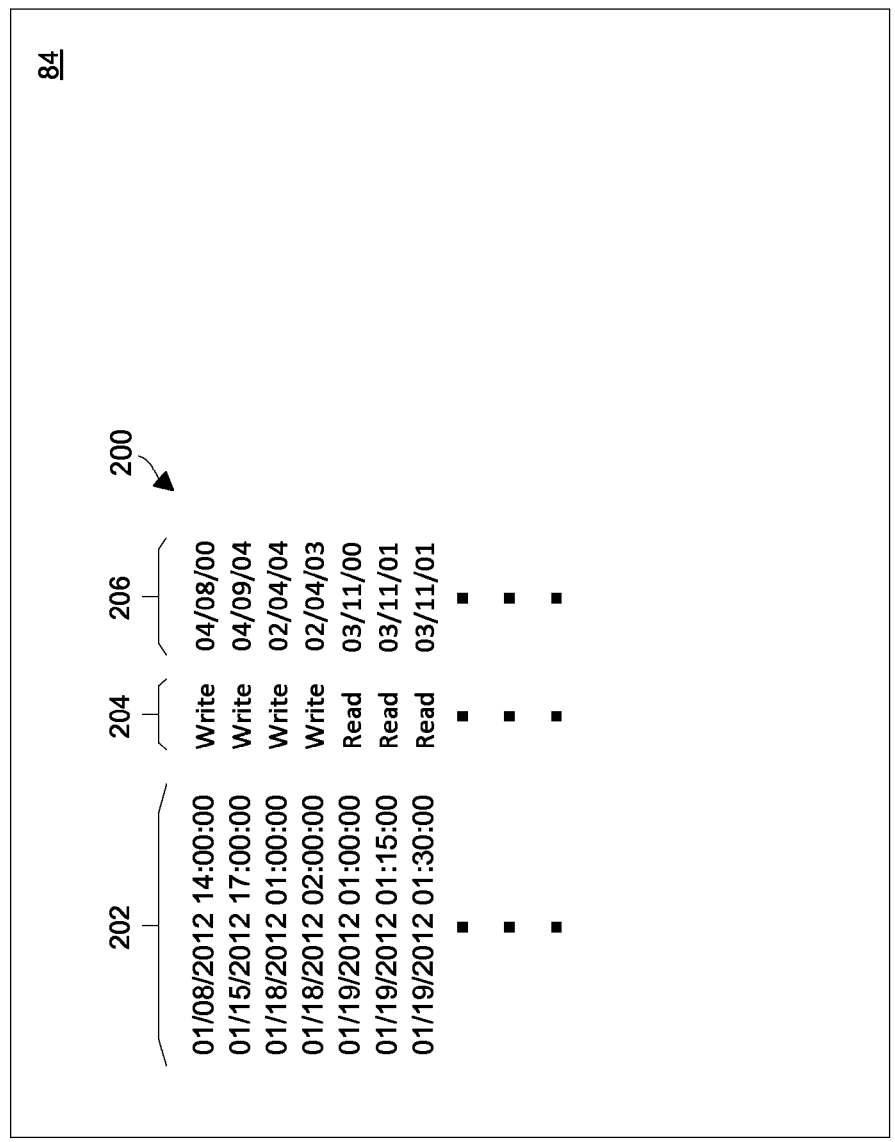
FIG. 4 is an example of a storage device error log utilized by the electronic apparatus of FIG. 2.

FIGS. 4 through 6 shows example input 102 and output 104 for the specialized tool 40 (also see FIG. 3). FIG. 4 shows a portion of a storage device error log 84 which is received by the storage array data extractor 110 of the specialized tool 40 (FIG. 3). FIG. 5 shows a portion of a data file 46 containing a set of storage device evaluation factors 48 which is received by the text string parser 112. FIG. 6 shows a portion of a report 150 of recommended activities to perform on the data storage array 22 that is provided by the reporting subsystem 116.

As shown in FIG. 4, the storage device error log 84 contains storage device error entries 200 identifying actual storage device error events 44 which were encountered by the set of storage devices 32 while performing data storage operations over a period of time (also see FIG. 1). Each storage device error entry 200 has a timestamp 202 which identifies a time of a particular storage device error event 44, an operation type 204 which identifies a type of operation that caused the particular storage device error event 44, and an error code 206 which identifies the particular error that was encountered. For example, a storage processor 34 of the data storage array 22 may log an entry 200 in the storage device error log 84 in response to an attempt to write to or read from a bad sector of a storage device 32 (also see FIG. 1).

It should be understood that the data storage array 22 is configured to provide the storage device error log 84 in this format enabling the storage array data extractor 110 to properly extract meaningful storage device error information from the storage device error log 84. Nevertheless, it should be further understood that other error log formats are contemplated and are suitable for use as well (e.g., different ordering of information, different formats for the individual data items, additional information, etc.).

As shown in FIG. 5, the data file 46 contains a set of storage device evaluation factor definitions 210 which defines the storage device evaluation factors 48 (or evaluation logic) used to evaluate the storage device error information obtained from the storage device error log 84 (FIG. 4). Each factor definition 210 is a parsable text string which complies with a standard definition format as follows:

factor-type [identifier].attribute-type operator expression (1).

For this equation-style format (1), it should be understood that certain components of each factor definition 210 may be restricted to a predefined set of keywords or symbols. Additionally, the factor definitions 210 are order dependent in that the ordering of certain definitions indicates how certain expression data is to be interpreted.

Further details of how the factor definitions 210 are interpreted by the specialized tool 40 are provided below. The factor-type of each definition 210 is capable of having one of a predefined factor type:

TABLE 1

| Type | Description |
|---|---|
| drive | Identifies an attribute value for a particular drive |
| sense | Defines weights and time windows for certain errors for each drive |
| rule | Defines criteria for post processing error conditions and outputting a recommended activity |

Via these types of factor definitions 210, a user is able to (i) map possible storage device error events 44 to individual weights and (ii) map cumulative weights to recommended activities. Other factor-types are contemplated, and these factor-type are provided by way of example only.

The identifier of each definition 210 may be any text that uniquely identifies a definition 210. If the type of the definition 210 is "drive", the definition may correspond to a single type of a storage device if the particular identifier is used only once. However, as will be explained in further detail below, multiple definitions 210 using the particular identifier also may be used to refer to a group.

The attribute-type of each definition 210 identifies the left hand side of the definition equation. Attribute-types are limited to the original definition of the rule type. For example, attributes such as "vendor_id" and "tla_part_number" are suitable attribute-types for "drive" rules.

The operator of each definition 210 identifies a type of logical operation for matching the attribute-type and the expression for a definition equation. Examples of logical operations include "=" for equal to, ">" for greater than, "<" for less than, ">=" for greater than or equal to, "<=" for less than or equal to, "< >" for not equal to, and "~" for regular expression.

The expression of each definition 210 is the right hand side of the definition equation. An individual expression can be combined with logical operators and other individual expressions to form a complex or chain expression. Suitable logical operators include "||" for a logical OR, and "&&" for logical AND.

As mentioned above in connection with Table 1, there are three types of definitions 210 (drive, sense and rule). The first type of definition 210 is a drive type definition 210 which specifies an identity for a particular type of storage device (or drive). Each drive type definition 210 may have multiple attributes to match and hence can be used to form a unique identification for a trait of drives. Table 2 provides example attributes for drive types.

TABLE 2

| Attribute | Description |
| --- | --- |
| vendor_id | Vendor ID of the drive |
| product_id | Product ID of the drive |
| product_revision | Product revision of the drive |
| part_number | Part number of the drive (recognized internally by the manufacturer of the data storage array) |
| release | Operating system revision (recognized internally by the manufacturer of the data storage array) |

For example, the following factor definitions 210 can be used to identify a particular type of Samsung SSD drives with specific part numbers:

drive[samsung_ssd].vendor_id~'SAMSUNG||SATA\-SAM'
    drive[samsung_ssd]
        .tla_part_number~'0050491841100504927511005049189'

A second type of definition is a sense error definition 210 which identifies a range of sense errors and is collated with the actual weights and time window of the error (e.g, in seconds). When a cumulative weight crosses a predetermined threshold such as 100, the definition 210 fails, i.e., falls into a "RED" or failed state. When the weights reach a threshold range such as 90-100, the definition 210 alarms a warning, i.e., falls into a "YELLOW" or warning state. As mentioned earlier, cumulative (or overall) weights are maintained by the evaluation engine 114 in the form of weight totals and other data structures 142 (also see FIG. 3).

Each sense error definition 210 has a value for the identifier and "record" as an attribute. Accordingly, the format for each sense error definitions is consistent with the standard definition format (see format (1) above).

The value of the definition attribute is further distributed to allow for flexibility in sense definitions matching. This is a convenient and useful aspect of the data file 46. In particular, the expression in each definition 210 is split into two parts: a sense error portion and one or more weight allocation portions which are all separated by commas. The weight allocation portions correspond to the various types of storage devices 32 in the order in which the storage devices 32 were listed. This enables mapping of storage device error events to respective individual weights depending on the type of storage device 32. Additionally, the sense error portion matches a range of sense errors of interest. It supports comparison operations and a special value "*" which means all the available values.

TABLE 3

| Sense Error Portion | Description |
| --- | --- |
| Read/Write | "r" or "w" for Read or Write cases |
| Sense Key | Sense error key |
| Sense Code | Sense error code |
| Sense Qualifier | Sense error qualifier |

As just mentioned, each weight allocation portion matches the range of sense errors to a drive definition 210 defined in the order of drive definitions 210. Each weight allocation portion of a sense error definition 210 defines a weight and an error window for that sense error definition 210. One other feature of this system is to group the sense definitions 210 together so as to act as a single unit for overall weight evaluation. If the group is defined as "X" it is assumed to be an independent rule.

TABLE 4

| Weight Allocation Portion | Description |
| --- | --- |
| Weight | Weight (cannot be more than 100) |
| Time Window | Window in seconds |
| Group | "X" or any other value |

The following are examples of how a storage device evaluation factor 48 maps a storage device error event 44 to individual weights. Suppose that the user wishes to identify a sense error such as 03/11/All for read. Further suppose that the user wishes to give this sense error a weight of 10, a window of 24 hours (i.e. 86400 seconds), and make this an exclusive rule (rather than belong to a group). The following definition is suitable for use:

sense[2].definition='r,03,11,*,10,86400,X' (2).

As another example, suppose that the user wishes to identify sense errors which act together as follows. First, suppose that the user wishes to identify a sense error such as 02/<12H/All for write, and give this sense error a weight of 10, and a window of 24 hours (i.e. 86400 seconds). Second, suppose that the user wishes to identify a sense error such as 04/>=19H/All for write, and give this sense error a weight of 50, and a window of 7 days (i.e. 604800 seconds). To identify sense errors which act together in this manner the following definitions 210 are suitable for use:

sense[3].definition='w,02,<12H,*,20,86400,WG1'
    sense[4].definition='w,04,>=19H,*,50,604800,WG1' (3).

A third type of definition 210 is a rule definition 210. Rule definitions 210 are applied as per logic after all the prior rule processing completes. Such rule definitions 210 map cumulative weights to recommended activities so that such post processing can suggest particular results/recommendations. Each rule definition has an attribute as follows:

TABLE 5

| Attribute | Description |
| --- | --- |
| status | Status of the drive, this is the worst case scenario of all the applicable rules. Values can be Red, Yellow or Green |

TABLE 5-continued

| Attribute | Description |
|---|---|
| product_id | Product ID of the drive |
| product_revision | Product revision of the drive |
| part_number | Part number of the drive |
| release | Operating system revision |
| drive_header_rule | Applicable drive header rules |
| sense_rule_count[sense rule][drive header rule] | This is a special case where you want to check the actual weight for a particular sense definition and its associated driver header rule |
| result | Final result |

The following is an example of a set of post processing rule definitions 210 for recommending a particular activity. Suppose that the user wishes to identify a particular type of Samsung SSD drive with specific part numbers, which failed the sense error rules (either RED or YELLOW) and which is not of a particular version. Further suppose that the user wishes have the result suggest replacing the drive with a drive of a particular version. The following set of rule definitions 210 is suitable for use:

rule[samsung_ssd_r1].status~(red||yellow)
rule[samsung_ssd_r1].drive_header_rule~(samsung_ssd)
rule[samsung_ssd_r1].product_revision<>(TC3Q/2264)
rule[samsung_ssd_r1].result='Replace the drive with a spare that has TC3Q/2264 firmware installed on it.' (4).

FIG. 6 shows a portion of a report 150 of recommended activities 220 to perform on the data storage array 22 that is provided by the reporting subsystem 116. Each recommended activity 220 is an instruction to the user to take particular action which is designed to improve performance of the data storage array 22. The report 150 is displayable on the user interface 74 (FIG. 2), as well as storable in file for subsequent access.

Figure 7:
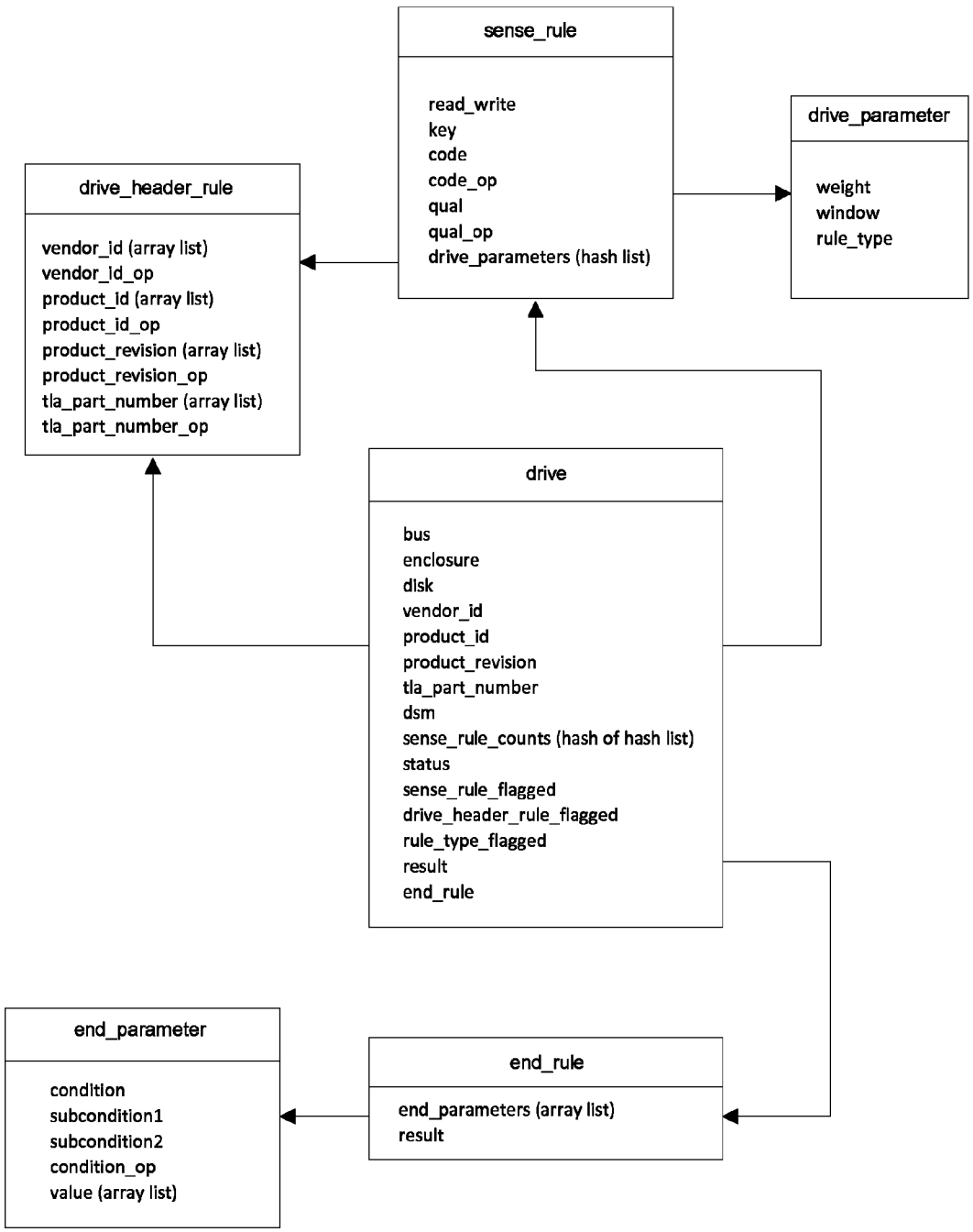
FIG. 7 is a class structure which is suitable for a specialized tool of the electronic apparatus of FIG. 2.

FIG. 7 shows a suitable class structure for storing weights and logic. Although other class structures are contemplated, the class structure of FIG. 7 illustrates relations which are appropriate for the examples described herein.

Figure 8:
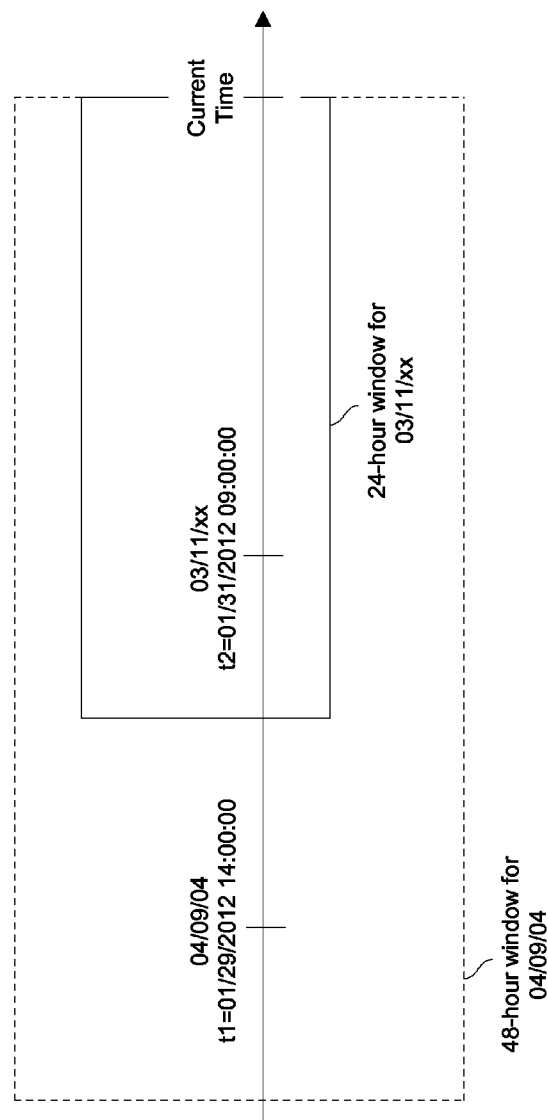
FIG. 8 is a sliding window illustration which provides details of a particular operation of the specialized tool of the electronic apparatus of FIG. 2.

FIG. 8 shows diagrammatically how the specialized tool 40 is capable of utilizing a sliding window approach to analyze drive errors. As per the definition of the underlying concept, different types of drive issues may manifest themselves via combinations of errors in different time windows. The sliding window approach ensures that different errors together in presence of each other crossing different time windows (e.g., more than 24 hours) can be analyzed for potential issues.

As shown in FIG. 8, each error falls within the specified window. That is, a first set of storage device evaluation factor definitions 210 is capable of identifying a first amount of time from current time to define a first time window for detection of a first type of storage device error event (e.g., the error at t1). Additionally, a second set of storage device evaluation factor definitions 210 is capable of identifying a second amount of time from current time to define a second time window for detection of a second type of storage device error event (e.g., the error at 0). Clearly, the first amount of time and the second amount of time are overlap, and are different extending from current time. Such features enable sliding-window style detection of a particular error manifested by (i) an occurrence of the first type of storage device error event during the first time window together with the (ii) an occurrence of the second type of storage device error event during the second time window.

During operation, each error is capable of being multiplied by an assigned weight. All the results are totaled together and if the total crosses the warning threshold (e.g., 90) then a warning is triggered. However, if the cumulative weight crosses a failure threshold (e.g., 100), a failure occurs triggering the failure definition. Use of assigned weights for each family or individual errors gives complete control over the outcome of the results/recommendations. Moreover, errors which need to weigh more during a particular window are not masked by fading away as time progresses as would happen using a conventional fading algorithm.

The following example illustrates further details of operation of the specialized tool 40. Suppose that a Samsung drive (P/N 005049275) is exhibiting errors. Further suppose that the firmware on the drive is TC3Q/2250, and that the user has the following information:

Drive Errors

TABLE 6

| Timestamp | Read/Write | Error |
|---|---|---|
| Jan. 08, 2012 14:00:00 | Write | 04/08/00 |
| Jan. 15, 2012 17:00:00 | Write | 04/09/04 |
| Jan. 18, 2012 01:00:00 | Write | 02/04/04 |
| Jan. 18, 2012 02:00:00 | Write | 02/04/03 |
| Jan. 19, 2012 01:00:00 | Read | 03/11/00 |
| Jan. 19, 2012 01:15:00 | Read | 03/11/01 |
| Jan. 19, 2012 01:30:00 | Read | 03/11/01 |

Data File
drive[samsung_ssd].vendor_id~'SAMSUNG||SATA†-AM'
drive[samsung_ssd]
 .tla_part_number~'005049184||005049275||005049189'
sense[1].definition='r,01,<19H,*,1,604800,X'
sense[2].definition='r,03,11,*,10,86400,X'
sense[3].definition='w,02,<12H,*,20,86400,WG1'
sense[4].definition='w,04,>=19H,*,50,604800,WG1'
rule[samsung_ssd_r1].status~(red||yellow)
rule[samsung_ssd_r1].drive_header_rule~(samsung_ssd)
rule[samsung_ssd_r1].product_revision<>(TC3Q/2264)
rule[samsung_ssd_r1].result='Replace the drive with a spare that has TC3Q/2264 firmware installed on it.'
Based on the following drive definitions from the data file:
drive[samsung_ssd].vendor_id~'SAMSUNG||SATA†-SAM'
drive[samsung_ssd]
 .tla_part_number~'005049184||005049275||005049189'
the drive under consideration exactly matches the "samsung_ssd" pattern and hence is evaluated as the same.

Additionally, based on the sense definitions from the data file:
sense[1].definition='r,01,<19H,*,1,604800,X'
sense[2].definition='r,03,11,*,10,86400,X'
sense[3].definition='w,02,<12H,*,20,86400,WG1'
sense[4].definition='w,04,>=19H,*,50,604800,WG1'
the specialized tool 40 is able to process the errors of the storage device error log as follows:

TABLE 7

| Timestamp | Read/Write | Error | Rule Applied | Group | Weights | Verdict | Total |
|---|---|---|---|---|---|---|---|
| 01/08/2012 14:00:00 | Write | 04/08/00 | sense[4] | WG1 | 50 | Ignored | (outside window) |
| 01/15/2012 17:00:00 | Write | 04/09/04 | sense[4] | WG1 | 50 | Valid | |
| 01/18/2012 01:00:00 | Write | 02/04/04 | sense[4] | WG1 | 20 | Valid | 90 |

TABLE 7-continued

| Timestamp | Read/Write | Error | Rule Applied | Group | Weights | Verdict | Total |
|---|---|---|---|---|---|---|---|
| 01/18/2012 02:00:00 | Write | 02/04/03 | sense[3] | WG1 | 20 | Valid | |
| 01/19/2012 01:00:00 | Read | 03/11/00 | sense[2] | X | 10 | Valid | |
| 01/19/2012 01:15:00 | Read | 03/11/01 | sense[2] | X | 10 | Valid | 30 |
| 01/19/2012 01:45:00 | Read | 03/11/01 | sense[2] | X | 10 | Valid | |

The sense definitions 3 and 4 are grouped together as WG1. Accordingly, the evaluations of the parameters are done together.

From the total above we get:
  sense definition 3 and 4, group WG1=90, crossed into a warning threshold
  sense definition 2, group X=30, still under 90 and hence passed Furthermore, based on application of the following post processing definitions:
  rule[samsung_ssd_r1].status~(red||yellow)
  rule[samsung_ssd_r1].drive_header_rule~(samsung_ssd)
  rule[samsung_ssd_r1].product_revision< >(TC3Q/2264)
  rule[samsung_ssd_r1].result='Replace the drive with a spare that has TC3Q/2264 firmware installed on it.' all the criteria's for post processing rule "samsung_ssd_r1" are satisfied here:
  1. Sense rule 3 & 4 caused this rule to move to "warning" state
  2. Drive is identified as "samsung_ssd"
  3. Drive firmware is TC3Q/2250 which is not equal to TC3Q/2264

Based on the above evaluation the drive is recommended to be replaced with a spare consisting of TC3Q/2264 firmware.

Figure 9:
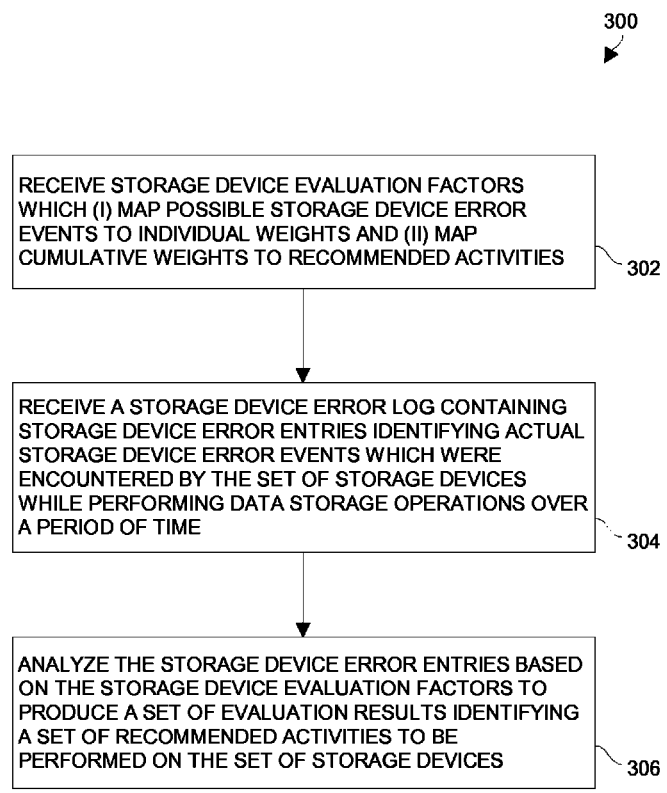
FIG. 9 is a flowchart of a procedure which is performed by the electronic apparatus of FIG. 2.

FIG. 9 is a flowchart of a procedure 300 which is performed by the electronic apparatus 70 of FIG. 2 when evaluating a set of storage devices 32 (also see FIG. 1). In step 302, the electronic apparatus 70 receives storage device evaluation factors 48 which (i) map possible storage device error events to individual weights and (ii) map cumulative weights to recommended activities. In particular, recall that the factor definitions 210 contained in the data file 46 (FIG. 5) establish identities for types of storage devices 32 and groups of storage devices 32 in an order dependent listing (e.g., drive definitions 210). Additionally, the factor definitions 210 establish ranges of sense errors and individual weights to assign to particular types of storage devices 32 (e.g., sense definitions 210). Furthermore, the factor definitions 210 define criteria for particular recommendations and correspond those criteria to those recommendations (i.e., rule definitions 210).

In step 304, the electronic apparatus 70 receives a storage device error log 84 (FIG. 4) containing storage device error entries 200 identifying actual storage device error events 44 which were encountered by the set of storage devices 32 while performing data storage operations over a period of time. In some arrangements, the storage device error log 84 is received bundled with other information as SPcollects data.

In step 306, the electronic apparatus 70 analyzes the storage device error entries 200 based on the storage device evaluation factors 48 to produce a set of evaluation results identifying a set of recommended activities to be performed on the set of storage devices. These activities are provided to the user through a user interface 74 (FIG. 2). Accordingly, the user is able to receive richer guidance compared to a local data storage array utility which is restricted to simply killing or sparing drives.

As described above, an improved technique involves the use of a tool 40 which analyzes a storage device error log 84 identifying actual error events 44 which were encountered by storage devices 32, determines the health of the storage devices 32, and provides appropriate recommendations. With such recommendations, activities other than killing or sparing a storage device 32 are readily available such as upgrading an operating system, upgrading firmware, reseating a storage device, replacing a storage device, and so on. In some arrangements, the tool is configurable via a data file which stores a rich set of text-based factors (or configuration rules). Such an arrangement provides repeatability, flexibility, configuration ease, and the capability of detecting complex drive errors.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the electronic apparatus 70 of FIG. 2 is capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that specialized tool 40 was described as residing in a dedicated diagnostic computer 26 by way of example only (also see FIG. 1). Such placement of the specialized tool 40 externally from any host computers 24 and data storage arrays 22 enables the specialized tool 40 to operate in an offline manner which is non-disruptive to the host computers 24 and the data storage arrays 22 while these data storage components to continue to perform host IO operations. However, in some arrangements, the specialized tool 40 resides locally (e.g., within a data storage array 22, within a host computer 24, etc., see boxes 50, 52 in FIG. 1) and runs while host computers 24 and the data storage arrays 22 remain online thus (i) alleviating the need to push/pull the storage device error log 84 to another computerized device, and (ii) leveraging off of existing resources while the data storage components to continue to perform host IO operations.

One should appreciate that in conventional approaches, there is no way to analyze health of a drive based on SPcollects that can be gathered from a data storage array 22 deployed at a customer site in an offline mode. Additionally, with the conventional approaches, the local utility is limited to killing or sparing drives but does not provide or facilitate any other recommendations (e.g., if a drive media/hardware is fine and the issue is with the firmware or other non-drive parameters, the conventional approaches have no way handle such a scenario). Furthermore, turnaround time for updating the conventional local utility is aligned to the cycle of operating system releases. Moreover, in the conventional local, error weights are generic and cannot be fine-tuned to particular type or specific group of drives without corresponding code changes. Also, the conventional local utility always takes the drive errors as the primary focal point for drive health analysis, and does not evaluate other environmental parameters such as operating system revision, drive firmware revision, etc. The conventional local utility also does not provide a data file which enables complex logic building using logical or use of comparison operators. Additionally, the conventional local utility does not group errors into multiple buckets for compartmentalized evaluation.

However, with the specialized tool 40, a user is able to analyze errors logged by storage devices 32, determine health of a storage device 32 and receive appropriate recommendations. Along these lines, the user is able to manage (e.g., create, modify, etc.) a comprehensive external algorithm data file 46 as input, to map errors to recommendations. Additionally, the specialized tool 40 is capable of working in an offline mode (or an online mode) analyzing data logged on the array 22 and collected as part of SPcollects. Furthermore, the specialized tool 40 provides a more advanced process to the conventional local utility, where the conventional local utility is limited to killing or sparing drives (i.e., the conventional local utility cannot be fined tuned or tailored).

The specialized tool 40 on the other hand analyzes not just the data logged by the drive but also other environmental factors including operating system revision, drive type, drive part number, drive vendor, drive firmware, etc. The specialized tool 40 provides appropriate recommendations such as recommendations to upgrade the operating revision, to upgrade the drive firmware, to reseat the drive, to replace the drive (proactively or otherwise). Additionally, the specialized tool definitions 210 are flexible to enable building of complex logic with operators such as && (logical AND) and || (logical OR). Furthermore, the specialized tool 40 supports regular expressions for a flexible match of various environmental parameters. Moreover, the specialized tool 40 is capable of supporting use of "sliding windows" for advanced error analysis.

What is claimed is:

1. In an electronic apparatus having processing circuitry, a method of evaluating a set of storage devices, the set of storage devices including at least one disk drive, each storage device being constructed and arranged to store data on behalf of one or more host computers, the method comprising:
   receiving, by the processing circuitry, storage device evaluation factors which (i) map individual possible storage device error events to individual weights and (ii) map cumulative weights to recommended activities;
   receiving, by the processing circuitry, a storage device error log containing storage device error entries identifying actual individual storage device error events which were encountered by the set of storage devices while data storage operations were performed on the storage devices by a set of storage processors over a period of time, wherein the storage device evaluation factors map a first possible storage device error event to a first individual weight for a first type of storage device, and wherein the storage device evaluation factors map the first possible storage device error event to a second individual weight for a second type of storage device;
   analyzing, by the processing circuitry, the storage device error entries based on the storage device evaluation factors by weighting each individual one of the actual individual storage device error entries based on the storage device evaluation factors to produce a set of evaluation results identifying a set of recommended activities to be performed on the set of storage devices, wherein the analyzing includes i) assigning the individual weights mapped by the storage device evaluation factors to the actual storage device error events, ii) tabulating the assigned individual weights to form aggregate weights for the storage devices, and iii) matching the aggregated weights for the storage devices to the cumulative weights mapped by the storage device evaluation factors to identify the set of recommended activities; and
   displaying the set of recommended activities to a user.

2. A method as in claim 1 wherein receiving the storage device evaluation factors includes:
   inputting the storage device evaluation factors from a data file, each storage device evaluation factor having a standard definition format.

3. A method as in claim 2 wherein the data file stores the storage device evaluation factors as separate text strings; and wherein inputting the storage device evaluation factors from the data file includes:
   opening the data file, and reading and parsing each text string from the data file in accordance with the standard definition format.

4. A method as in claim 3 wherein parsing each text string from the data file includes:
   for each text string, identifying an attribute of that text string and an expression of that text string based on placement of a logical operator within that text string.

5. A method as in claim 3 wherein parsing each text string includes:
   for a first text string, identifying a first amount of time from current time to define a first time window for detection of a first type of storage device error event, and
   for a second text string, identifying a second amount of time from current time to define a second time window for detection of a second type of storage device error event; and
   wherein the first amount of time and the second amount of time are different to enable sliding-window style detection of a particular error manifested by (i) an occurrence of the first type of storage device error event during the first time window together with the (ii) an occurrence of the second type of storage device error event during the second time window.

6. A method as in claim 2 wherein receiving the storage device error log containing storage device error entries includes:
   extracting model details from a collection of storage processor (SP) files, the model details identifying each storage device of the set of storage devices by manufacturer model number, and
   extracting the storage device error log containing the storage device error entries from the collection of SP files.

7. A method as in claim 1 wherein tabulating the assigned individual weights to form aggregate weights for the storage devices includes:
   tallying an aggregate weight for a group of multiple storage units of the set of storage devices.

8. A method as in claim 1 wherein tabulating the assigned individual weights to form aggregate weights for the storage devices includes:
   tallying an aggregate weight for an individual storage unit of the set of storage devices.

9. A method as in claim 1, further comprising:
   displaying the set of recommended activities to the user to direct the user to perform the recommended activities on the set of storage devices.

10. A method as in claim 6 wherein the set of storage devices belong to a data storage array which is external to the electronic apparatus; and wherein the method further comprises:

obtaining the collection of SP files from the data storage array through a computer network while the data storage array performs host input/output (IO) operations on the set of storage devices belonging to the data storage array, and continuing to perform host IO operations on the set of storage devices while the electronic apparatus concurrently evaluates the set of storage devices in an offline manner.

11. A method as in claim 9 wherein the electronic apparatus is a storage processor belonging to a data storage array; wherein the set of storage devices belong to the data storage array; and wherein the method further comprises:

performing, by the storage processor, host IO operations on the set of storage devices while the storage processor concurrently evaluates the set of storage devices in an online manner.

12. A method as in claim 1 further including mapping possible storage device error events to individual weights in a predefined range having a lower weight limit and an upper weight limit; and wherein identifying a set of recommended activities to be performed on the set of storage devices includes analyzing the cumulative weight of the individual weights with respect to the predefined range.

13. A method as in claim 1 wherein the processing circuitry includes multiple storage processors for fault tolerance and load balancing, and wherein receiving the storage device error log includes receiving configuration information, the configuration information including configuration parameters such as RAID (Redundant Array of Individual Disks) groupings.

14. A method as in claim 1 wherein the set of storage devices includes a first working storage device and a second working storage device, the first working storage device operating with a more recent firmware upgrade relative to the second working storage device; and wherein analyzing the storage device error entries includes:

producing, as an evaluation result, a recommendation to upgrade firmware of the second working storage device to the more recent firmware upgrade to provide compatibility between the first working storage device and second working storage device while the first working storage device and the second working storage device provide storage as a Redundant Array of Individual Disks (RAID) group.

15. A method as in claim 1 wherein receiving the storage device evaluation factors includes:

acquiring, as input, a data file containing the storage device evaluation factors, and reading the storage device evaluation factors from the data file, the storage device evaluation factors defining rules for evaluating the set of storage devices;

wherein receiving the storage device error log containing the storage device error entries includes:

obtaining an entry log of actual storage device errors which were encountered by the set of storage devices during operation of the set of storage devices; and wherein analyzing the storage device error entries includes:

applying the rules defined by the storage device evaluation factors to the entry log of actual storage device errors to identify a set of re-configuration activities recommended to remedy the actual storage device errors.

16. A method as in claim 15 wherein each storage device of the set of storage devices is an electronic memory apparatus which fits into a data storage array; and wherein the set of re-configuration activities recommended to remedy the actual storage device errors includes a set of recommendations to improve performance of the data storage array.

17. A method as in claim 5 wherein each of the storage device error entries in the storage device error log further includes a timestamp identifying a time of the storage device error event identified by the entry, an operation type identifying a type of operation that caused the storage device error event identified by the entry, and an error code identifying the error event identified by the entry.

18. A method as in claim 17 wherein the storage device evaluation factors map a first possible storage device error event to a first individual weight and the first time window, and map a second storage device error event to a second individual weight and the second time window; and wherein analyzing the storage device error entries in the storage device error log includes applying the first individual weight to those entries having an error code identifying the first possible storage device error event and include a timestamp identifying a time during the first time window, and applying the second individual weight to those entries having an error code identifying the second possible storage device error event and include a timestamp identifying a time during the second time window.

19. A method as in claim 1, wherein the storage device evaluation factors map a first one of the cumulative weights to a recommended activity of upgrading disk drive firmware, the method further comprising;

receiving, by the processing circuitry, together with the storage device error log, configuration data including an indication of a version of firmware of a disk drive in the set of storage devices;

wherein matching the aggregated weights for the storage devices to the cumulative weights identifies the recommended activity of upgrading disk drive firmware; and wherein displaying the set of recommended activities to the user includes displaying the recommended activity of upgrading disk drive firmware of the disk drive in the set of storage devices.

20. A computer program product having a non-transitory computer readable medium which stores a set of instructions to evaluate a set of storage devices, the set of storage devices including at least one disk drive and constructed and arranged to store data on behalf of one or more host computers, the set of instructions, when carried out by computerized circuitry, causing the computerized circuitry to perform a method of:

receiving, by the computerized circuitry, storage device evaluation factors which (i) map individual possible storage device error events to individual weights and (ii) map cumulative weights to recommended activities;

receiving, by the computerized circuitry, a storage device error log containing storage device error entries identifying actual individual storage device error events which were encountered by the set of storage devices while data storage operations were performed on the storage devices by a set of storage processors over a period of time, wherein the storage device evaluation factors map a first possible storage device error event to a first individual weight for a first type of storage device, and wherein the storage device evaluation factors map the first possible storage device error event to a second individual weight for a second type of storage device;

analyzing, by the computerized circuitry, the storage device error entries based on the storage device evaluation factors by weighting each individual one of the actual individual storage device error entries based on the storage device evaluation factors to produce a set of evaluation results identifying a set of recommended activities to be performed on the set of storage devices, wherein the analyzing includes i) assigning the individual weights mapped by the storage device evaluation factors to the actual storage device error events, ii) tabulating the assigned individual weights to form aggregate weights for the storage devices, and iii) matching the aggregated weights for the storage devices to the cumulative weights mapped by the storage device evaluation factors to identify the set of recommended activities; and displaying the set of recommended activities to a user.

21. A computer program product as in claim 20 wherein receiving the storage device evaluation factors includes:

inputting the storage device evaluation factors from a data file, each storage device evaluation factor having a standard definition format.

22. A computer program product as in claim 21 wherein the data file stores the storage device evaluation factors as separate text strings; and wherein inputting the storage device evaluation factors from the data file includes:

opening the data file, and reading and parsing each text string from the data file in accordance with the standard definition format.

23. A computer program product as in claim 22 wherein parsing each text string from the data file includes:

for each text string, identifying an attribute of that text string and an expression of that text string based on placement of a logical operator within that text string.

24. A computer program product as in claim 22 wherein parsing each text string includes:

for a first text string, identifying a first amount of time from current time to define a first time window for detection of a first type of storage device error event, and for a second text string, identifying a second amount of time from current time to define a second time window for detection of a second type of storage device error event; and wherein the first amount of time and the second amount of time are different to enable sliding-window style detection of a particular error manifested by (i) an occurrence of the first type of storage device error event during the first time window together with the (ii) an occurrence of the second type of storage device error event during the second time window.

25. A computer program product as in claim 21 wherein receiving the storage device error log containing storage device error entries includes:

extracting model details from a collection of storage processor (SP) files, the model details identifying each storage device of the set of storage devices by manufacturer model number, and extracting the storage device error log containing the storage device error entries from the collection of SP files.

26. An electronic apparatus to evaluate a set of storage devices, the set of storage devices including at least one disk drive and configured and arranged to store data on behalf of one or more host computers, the electronic apparatus comprising:

a user interface;

memory; and processing circuitry coupled to the user interface and the memory, the processing circuitry being constructed and arranged to:

receive, from the memory, storage device evaluation factors which (i) map individual possible storage device error events to individual weights and (ii) map cumulative weights to recommended activities, receive, from the memory, a storage device error log containing storage device error entries identifying actual individual storage device error events which were encountered by the set of storage devices while data storage operations were performed on the storage devices by a set of storage processors over a period of time, wherein the storage device evaluation factors map a first possible storage device error event to a first individual weight for a first type of storage device, and wherein the storage device evaluation factors map the first possible storage device error event to a second individual weight for a second type of storage device, analyze the storage device error entries based on the storage device evaluation factors by weighting each individual one of the error entries based on the storage device evaluation factors to produce a set of evaluation results identifying a set of recommended activities to be performed on the set of storage devices, wherein the storage device error entries are analyzed at least in part by i) assigning the individual weights mapped by the storage device evaluation factors to the actual storage device error events, ii) tabulating the assigned individual weights to form aggregate weights for the storage devices, and iii) matching the aggregated weights for the storage devices to the cumulative weights mapped by the storage device evaluation factors to identify the set of recommended activities, and display, through the user interface, the set of recommended activities to be performed on the set of storage devices.

* * * * *